(12) United States Patent
Grubbs et al.

(10) Patent No.: US 9,684,347 B2
(45) Date of Patent: Jun. 20, 2017

(54) SYSTEMS AND METHODS FOR AUTOMATED DISPLAY OF PERMISSIVE LOGIC IN CONTROL SYSTEMS ASSOCIATED WITH A POWER GENERATION UNIT

(71) Applicant: General Electric Company, Schenectady, NY (US)

(72) Inventors: Robert William Grubbs, Salem, VA (US); Lester D. Childs, Salem, VA (US); Adam Foard, Salem, VA (US); Muhammad Adnan, Salem, VA (US); Timothy Joseph Rhode, Salem, VA (US)

(73) Assignee: General Electric Company, Schenectady, NY (US)

( * ) Notice: Subject to any disclaimer, the term of this patent is extended or adjusted under 35 U.S.C. 154(b) by 559 days.

(21) Appl. No.: 13/745,165

(22) Filed: Jan. 18, 2013

(65) Prior Publication Data

US 2014/0207261 A1      Jul. 24, 2014

(51) Int. Cl.
*G06F 1/26* (2006.01)
*G05B 19/409* (2006.01)

(52) U.S. Cl.
CPC ............ *G06F 1/26* (2013.01); *G05B 19/409* (2013.01); *G05B 2219/13041* (2013.01)

(58) Field of Classification Search
None
See application file for complete search history.

(56) References Cited

U.S. PATENT DOCUMENTS 5,168,441 A    12/1992   Onarheim et al.
5,812,394 A    9/1998    Lewis et al.
(Continued)

OTHER PUBLICATIONS

Chen et al., 'Power Quality Analysis Based on LABVIEW for current Power Generation System', International Symposium on Power Electronics, Electrical Drives, Automation and Motion, pp. 865-870, IEEE (2012).*

(Continued)

*Primary Examiner* — Mohammad Ali
*Assistant Examiner* — Bernard G Lindsay
(74) *Attorney, Agent, or Firm* — Eversheds-Sutherland (US) LLP

(57) ABSTRACT

Certain embodiments herein relate to automated display of permissive logic in control systems associated with a power generation unit. A control device may be configured to provide automated updates of system data, such as signals received from power generation equipment, to a human machine interface (HMI) or a supervisory control and data acquisition (SCADA) display, as non-limiting examples. A logic builder block may receive permissive logic configurations, including one or more combinational logic blocks. A logic builder block may be associated with power generation equipment to facilitate the identification of related system data and the subsequent association of the system data to corresponding input pins for the combinational logic blocks. The permissive logic configurations may be compiled into object code and downloaded to the control device, where it may be executed to perform the above described functions, among other functions.

17 Claims, 6 Drawing Sheets

(56) References Cited

U.S. PATENT DOCUMENTS

| | | | |
|---|---|---|---|
| 5,838,588 A | 11/1998 | Santoso et al. | |
| 6,157,864 A | 12/2000 | Schwenke et al. | |
| 6,201,996 B1* | 3/2001 | Crater | G05B 19/0421 |
| | | | 700/69 |
| 6,580,953 B1 | 6/2003 | Wiebe et al. | |
| 7,146,231 B2 | 12/2006 | Schleiss et al. | |
| 2003/0037316 A1 | 2/2003 | Kodosky et al. | |
| 2004/0181293 A1 | 9/2004 | Tanizawa et al. | |
| 2008/0120532 A1 | 5/2008 | Lange et al. | |
| 2008/0127065 A1 | 5/2008 | Bryant et al. | |
| 2009/0327942 A1* | 12/2009 | Eldridge et al. | 715/771 |
| 2010/0123722 A1* | 5/2010 | Grubbs et al. | 345/473 |
| 2012/0026173 A1 | 2/2012 | Gabbert et al. | |

OTHER PUBLICATIONS

European Search Report and Opinion issued in connection with corresponding Application No. 14151493.5 on Aug. 19, 2014.

EP Search Report and Written Opinion issued Apr. 1, 2014 in connection with corresponding EP Patent Application No. 14151493.5.

Karl-Heinz John et al. "IEC 61131-3: Programming Industrial Automation Systems." ISBN 3-540-67752-6. Spinger: Berlin, 2001. pp. 128-140.

Karl-Heinz John et al. "IEC 61131-3: Programming Industrial Automation Systems." ISBN 3-540-67752-6. Spinger: Berlin, 2001. pp. 359-364.

* cited by examiner

SYSTEMS AND METHODS FOR AUTOMATED DISPLAY OF PERMISSIVE LOGIC IN CONTROL SYSTEMS ASSOCIATED WITH A POWER GENERATION UNIT

TECHNICAL FIELD

Embodiments of the disclosure relate generally to control systems, and more particularly, to automated display of permissive logic in controls systems associated with a power generation unit.

BACKGROUND OF THE DISCLOSURE

Control systems may include permissive logic that may permit or prohibit progression in a state machine or process. Operators or users may view the current state of permissive logic in control systems via human machine interface (HMI) or supervisory control and data acquisition (SCADA) screens, which may graphically depict such states. A graphical depiction may exist for each possible permissive logic state. In existing systems, unfortunately, each such graphical depiction may be manually generated, which may be costly, time-consuming, and error prone.

BRIEF DESCRIPTION OF THE DISCLOSURE

Some or all of the above needs and/or problems may be addressed by certain embodiments of the disclosure. Certain embodiments may include systems and methods for automated display of permissive logic in control systems associated with a power generation unit. According to one embodiment, there is disclosed a system for receiving, at a control device, one or more signals from a power generation unit; processing, by the control device, the one or more signals to control the power generation unit according to permissive logic instructions; and sending, by the control device, data associated with the one or more signals to a storage area for updating on a display, the display comprising a graphical representation of the permissive logic instructions.

According to another embodiment, there is disclosed a system including at least one memory that stores computer-executable instructions that, when executed by the at least one processor, configure the at least one processor to perform operations comprising receiving one or more signals from a power generation unit; processing the one or more signals to control the power generation unit according to the permissive logic instructions; and sending data associated with the one or more signals to a storage area for updating on a display, wherein the display comprises a graphical representation of the permissive logic instructions.

According to a further embodiment, there is disclosed a method for receiving, by a computing device, one or more inputs for configuring a control device to control a power generation unit; compiling, by the computing device, instructions associated with at least a portion of the one or more inputs to generate object code for execution by the control device; and sending, by the computing device, the compiled object code to the control device, wherein the compiled object code further configured the control device to send data associated with the one or more signals from the power generation unit to a display.

Other embodiments, systems, methods, apparatuses, aspects, and features of the disclosure will become apparent to those skilled in the art from the following detailed description, the accompanying drawings, and the appended claims.

BRIEF DESCRIPTION OF THE FIGURES

The detailed description is set forth with reference to the accompanying drawings, which are not necessarily drawn to scale. The use of the same reference numbers in different figures indicates similar or identical items, in accordance with an embodiment of the disclosure.

Figure 1A:
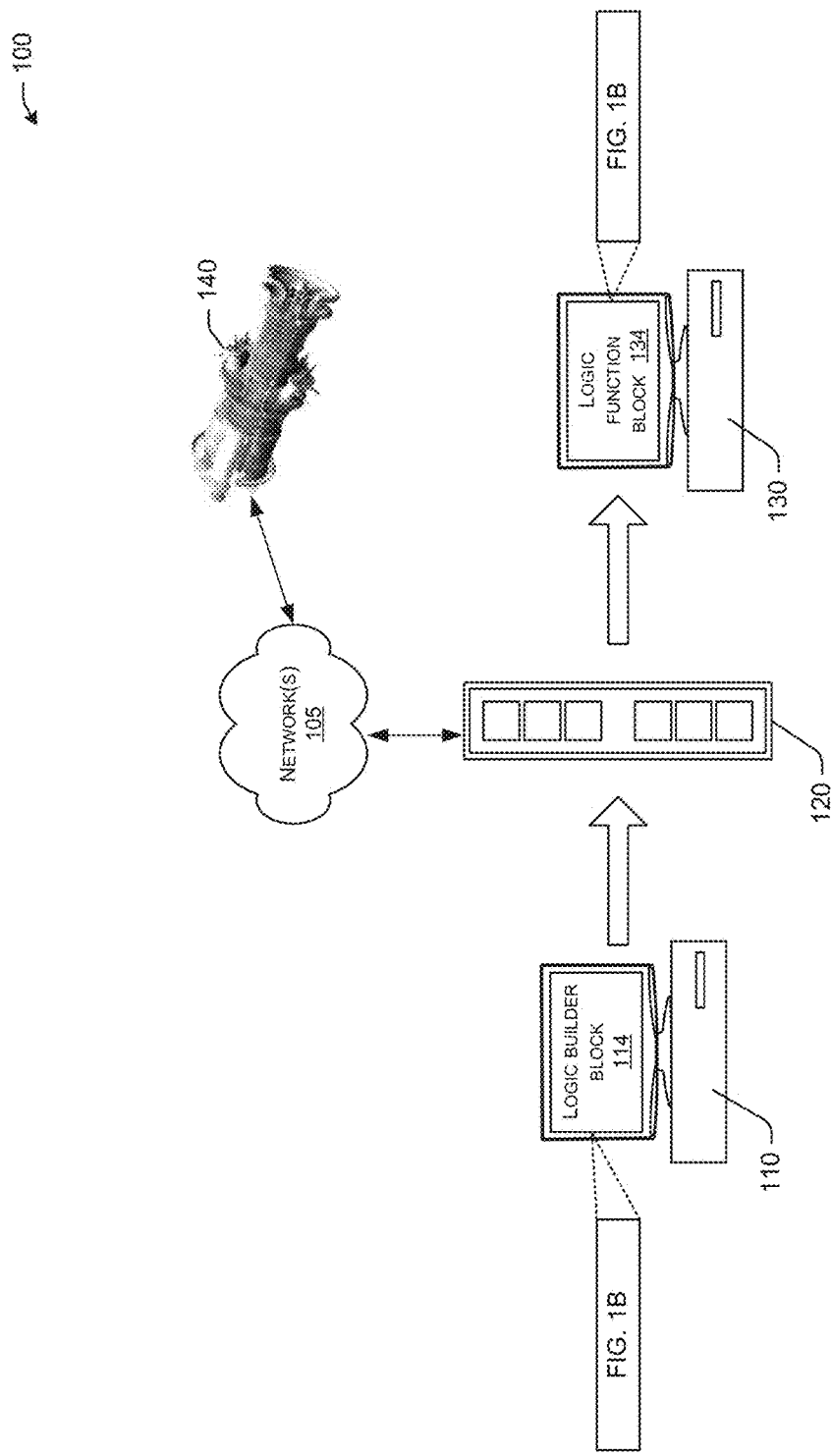
FIG. 1A illustrates an example system for automating the display of permissive logic, according to an embodiment of the disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Illustrative embodiments of the disclosure relate to, among other things, automated display of permissive logic in control systems associated with a power generation unit, such as a generator or a turbine. A control system or control device may be configured to receive signals from sensors associated with power generation equipment and process the signals according to permissive logic that may be executed by the control device. In accordance with processing such signals, the control device may send system real-time data associated with input and output pins for combinational logic blocks, such as those associated with AND, OR, and NOT Boolean operations, to HMI or SCADA screens (as non-limiting examples) for presentation to a user. A graphical representation of the combinational logic, e.g., a logic builder block or logic function block, may be updated with the data such that the user may receive a real-time update of the state of the power generation equipment.

Implementation of the automated display of permissive logic may include using a graphical editor to configure a logic builder block for controlling power generation equipment. A graphical representation of a logic builder block may be selected and associated with power generation equipment, for example, by naming the logic builder block consistently with the name of the power generation equipment. Such an association may facilitate the collection of system data from the power generation equipment and the relating of such data to appropriate input and output pins in the displayed logic builder block.

According to certain embodiments herein, configurations of combinational logic may be verified as they are entered, compiled into object code, and downloaded to a control device, where the object code may be executed to control associated power generation equipment and provide real-time system data. Certain embodiments herein may also relate to facilitating troubleshooting of power generation equipment. In one embodiment, changes in input pin values for logic function blocks (e.g., an AND, OR, or NOT block) may be detected and highlighted when such changes cause an output pin associated with such logic function blocks to change. In this way, a user may identify which input pins caused a change in output state and may further investigate the corresponding component of power generation equipment corresponding to the input pin.

The technical effects associated with certain embodiments herein may include, but are not limited to, reduced time and expense associated with manually creating HMI screens for each possible change in permissive logic, since system data may be updated in real-time according to certain embodiments herein. Further, the number of errors associated with generating an HMI screen may also be reduced, which may improve the reliability of control system processes and may further reduce costs.

Figure 1B:
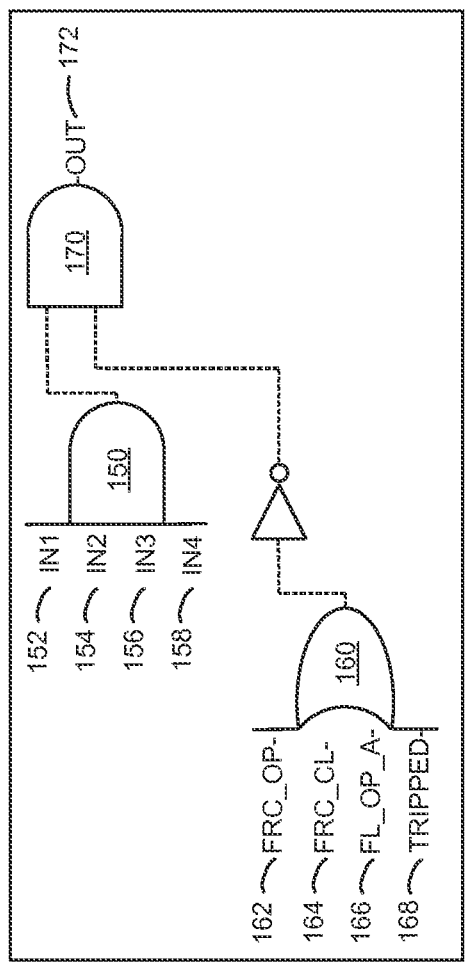
FIG. 1B illustrates an example display including a logic builder block, according to an embodiment of the disclosure.

FIG. 1A depicts an example system for implementing automated display of permissive logic, according to an embodiment of the disclosure. As shown in FIG. 1A, a configuration device 110 may include a logic builder block 114, into which a user may input one or more configurations of combinational logic, as shown in FIG. 1B and described below. FIG. 1A may also include a control device 120 and a display device 130 that may provide an HMI or SCADA display logic function block 134, which may render real-time updates to the graphical combinational logic configured in logic builder block 114. FIG. 1A may also include a power generation unit 140, such as a generator or turbine.

The control device 120 may communicate with the power generation unit 140 to receive signals associated with power generation equipment and send signals that may control such equipment, among other functions. The control device 120 may also communicate with the configuration device 110 to receive compiled configuration code that may instruct the control device 120 on how to control power generation equipment, in one embodiment. The control device 120 may further communicate with the display device 130 to upload system data, which as described, may be displayed graphically in a logic function block on the HMI screen 134 such that combinational logic that was created and compiled at the configuration device 110 may reflect the changes in the system data. As will be described in greater detail below, the control device 120 may execute the compiled configuration code to provide such uploads in real-time to the display device 130.

As mentioned, FIG. 1B may include combinational logic blocks 150, 160, and 170, which, according to the example in FIG. 1B, comprise permissive logic that may be executed by the control device 120. The combinational logic blocks may include input pins, as shown, which may each correspond to a signal associated with power generation equipment, in one embodiment. According to one aspect of an embodiment, one or more inputs pins associated with the combinational logic blocks may be updated based at least in part on data associated with their corresponding signal input. As shown in FIG. 1B, the combinational logic block 150 may include inputs pins 152, 154, 156, and 158; the combinational logic block 160 may include inputs pins 162, 164, 166, and 168; and the combinational logic block 170 may include an output pin 172, which the control device may determine based on values assigned to the input pins shown in FIG. 1B.

Figure 2:
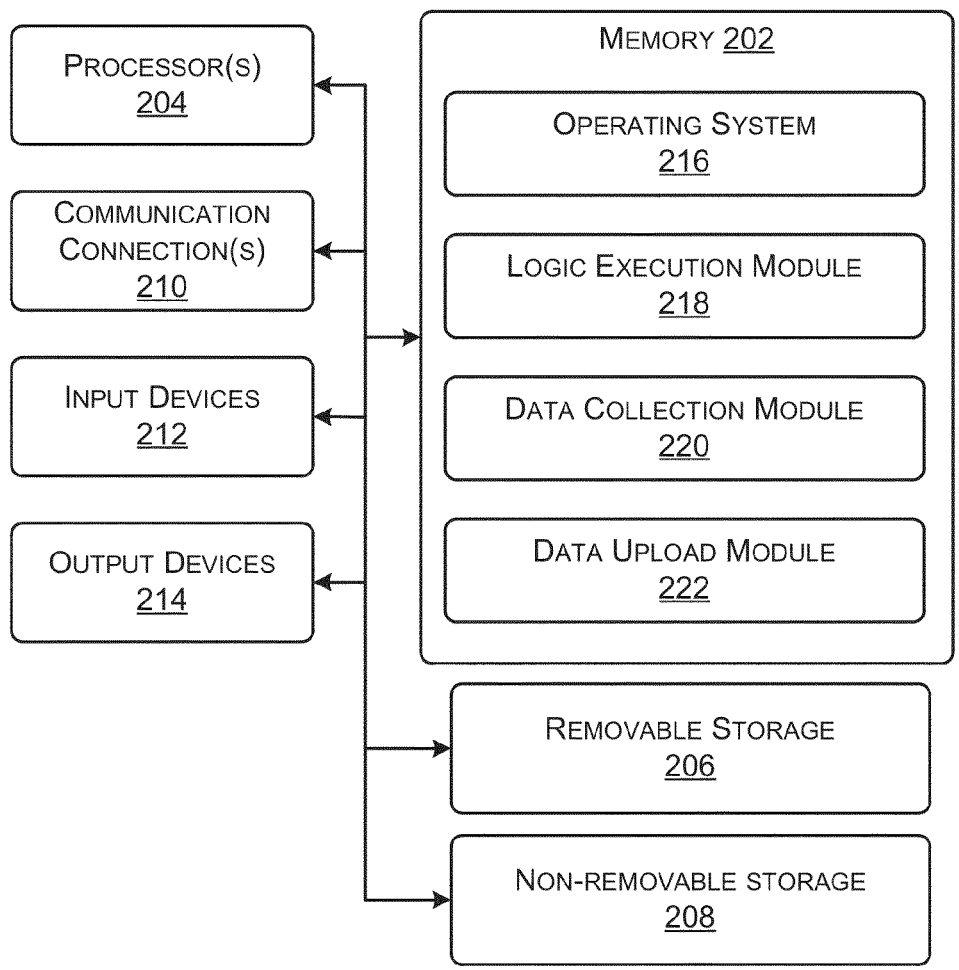
FIG. 2 illustrates an example computing environment for implementing the automated display of permissive logic, according to an embodiment of the disclosure.

FIG. 2 is a block diagram of an example computing environment 200 for implementing the automated display of permissive logic, according to an embodiment of the disclosure. The computing environment 200 may include a control device, e.g., control device 120 in FIG. 1A, which may include a processor 204 capable of communicating with a memory 202. The processor 204 may be implemented as appropriate in hardware, software, firmware, or combinations thereof. Software or firmware implementations of the processor 204 may include computer-executable or machine-executable instructions written in any suitable programming language to perform the various functions described. In one embodiment, instructions associated with a function block language may be stored in the memory 202 and executed by the processor 204.

A memory 202 may store program instructions that are loadable and executable on the processor 204, as well as data generated during the execution of these programs. Depending on the configuration and type of computing environment 200, a memory 202 may be volatile (such as random access memory (RAM)) and/or non-volatile (such as read-only memory (ROM), flash memory, etc.). In some embodiments, the devices may also include additional removable storage 206 and/or non-removable storage 208 including, but not limited to, magnetic storage, optical disks, and/or tape storage. The disk drives and their associated computer-readable media may provide non-volatile storage of computer-readable instructions, data structures, program modules, and other data for the devices. In some implementations, the memory 202 may include multiple different types of memory, such as static random access memory (SRAM), dynamic random access memory (DRAM), or ROM.

The memory 202, removable storage 206, and non-removable storage 208 are all examples of computer-readable storage media. For example, computer-readable storage media may include volatile and non-volatile, removable and non-removable media implemented in any method or technology for storage of information such as computer-readable instructions, data structures, program modules or other data. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVDs) or other optical storage, magnetic cassettes, magnetic tapes, magnetic disk storage or other magnetic storage devices, or any other medium which can be used to store the desired information and which can be accessed by the devices. Combinations of any of the above should also be included within the scope of computer-readable media.

The computing environment 200 may also include one or more communication connections 210 that may allow a control device to communicate with devices or equipment capable of communicating with a computing device. The connections can be established via various data communication channels or ports, such as universal serial bus (USB) or communication (COM) ports to receive connections for cables connecting a control device to various other devices on a network, such as the network 105. In one embodiment, the control device may include Ethernet drivers that enable the control device to communicate with other devices on the network 105. According to various embodiments, the connections 210 may be established via a wired and/or wireless connection on the network 105.

The computing environment 200 may also include one or more input devices 212, such as a keyboard, mouse, pen, voice input device, and touch input device. It may further include one or more output devices 214, such as a display, printer, and speakers.

In other embodiments, however, computer-readable communication media may include computer-readable instructions, program modules, or other data transmitted within a data signal, such as a carrier wave, or other transmission. As used herein, however, computer-readable storage media does not include computer-readable communication media.

Turning to the contents of the memory 202, the memory 202 may include, but is not limited to, an operating system (OS) 216 and one or more application programs or services for implementing the features and aspects disclosed herein. Such applications or services may include a logic execution module 218, which may include a data collection module 220 and a data upload module 222. In one embodiment, the modules 218, 220, and 222 may be implemented by software that is provided in configurable control block language and is stored in non-volatile memory.

The logic execution module 218 may configure a control device, e.g., the control device 120 in FIG. 1A, to control power generation equipment according to the instructions in the compiled logic execution module 218, in one embodiment. Such instructions may therefore configure the control device to permit or prohibit progression (e.g., in a state machine or process) according to configurations established by a user in a logic builder block, such as the logic builder block 114 shown in FIG. 1A. The logic execution module 218 may be compiled into byte code, executable code, etc., or may be stored in a format that may be interpreted, according to various embodiments. The logic execution module 218 may receive signals from power generation equipment and may send data associated with the signals to an HMI device. In one embodiment, an output pin associated with one or more combinational logic blocks may be updated based at least in part on the received signals. For example, the logic execution module 218 may execute permissive logic based on the received signals to determine an output pin value, which the data upload module 222 may send to a location for accessing and updating on the HMI or SCADA screen.

The data collection module 220 may receive signals from power generation equipment and associate the signals with input pins in a logic function block. In one aspect of an embodiment, a control device, e.g., via the data collection module 220, may associate one or more signals with one or more respective input pins associated with a graphical representation, such as a logic function block that includes combinational logic blocks. By virtue of power generation equipment being associated with a logic builder block at configuration time (e.g., in logic builder block 114 in FIG. 1A), the data collection module 218 may associate received signals with their associated input pins in the logic builder block. In an example embodiment, a solenoid operated valve (SOV) open permit may be controlled via the control device in FIG. 2. According to this example, the logic execution module 218 may execute permissive logic instructions based on the received signals to control the SOV. Data associated with the received signals, such as pin input data, which may also be referred to as system data or pin equations data, may be collected by the data collection module 220.

The data upload module 222 may send system data associated with logic function pins to an HMI screen. In one embodiment, the data upload module 222 may store the system data in one or more database tables, files, or other storage mechanisms from which the data may be accessed, for example, by an intermediary system that converts the system data to a graphical representation of input and output pin values in the logic function block associated with power generation equipment. In another embodiment, program code associated with an HMI/SCADA display may access the system data in a database by searching for data associated with input pins having certain identifiers. The program code may search for such identifiers by virtue of having access to the identifiers, for example, upon a logic builder block being associated with particular power generation equipment. Thus, input signals received from power generation equipment may be sent to associated inputs in combinational logic in a logic function block, which may display the same combinational logic blocks configured in the logic builder block, according to various embodiments. As data changes, e.g., as signals are received from power generation equipment and processed by the logic execution module 218, the data upload module 222 may send the data so that it may be updated on an HMI screen, i.e., in automated fashion.

Figure 3:
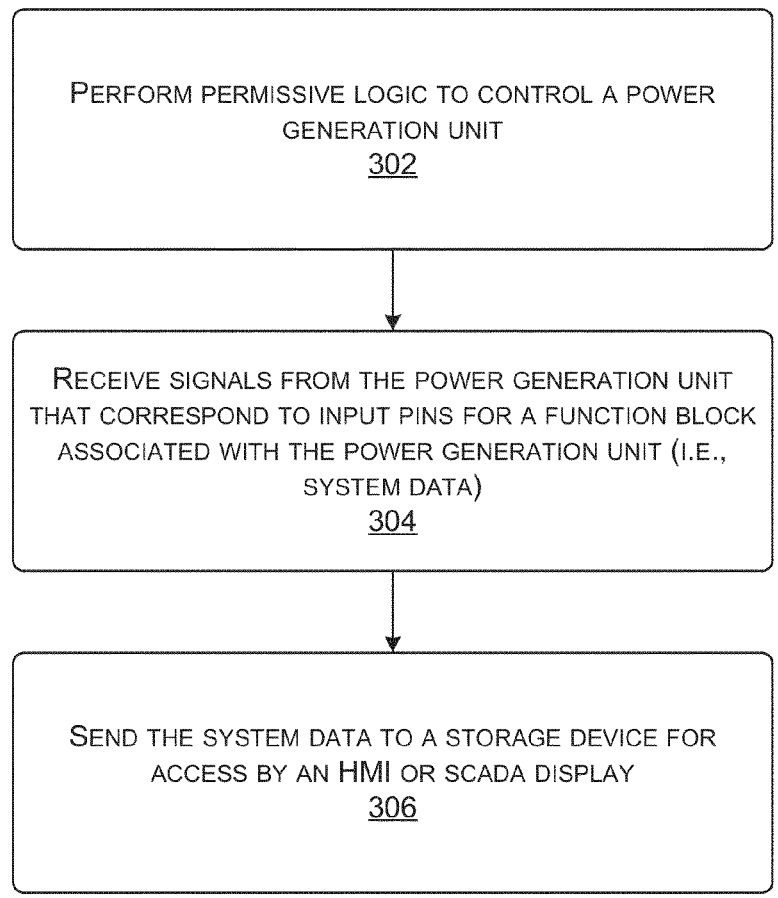
FIG. 3 illustrates a flow diagram of an example process for implementing the automated display of permissive logic, according to an embodiment of the disclosure.

FIG. 3 depicts a flow diagram of an example process 300 for implementing the automated display of permissive logic, according to an embodiment of the disclosure. In one embodiment, such implementation may be performed by the control device in the example computing environment 200 in FIG. 2. The example process may begin at block 302, where permissive logic for controlling a power generation unit, such as a generator, turbine (e.g., gas turbine or steam turbine), a compressor, a motor, etc., may be performed, e.g., via the logic execution module 218.

At block 304, signals from the power generation equipment that correspond to input pins for a logic function block associated with the power generation equipment (e.g., system data) may be received, e.g., via the data collection module 220. Input pins for a logic function block may be associated with the power generation equipment by virtue of associating a logic function block with the power generation equipment during configuration of a logic builder block, as will be described in FIG. 4.

At block 306, the received system data may be sent to a storage area, e.g., via the data upload module 222, for access by a system in communication with the HMI/SCADA screen viewed by an operator or other user. Such a system may convert the system data to a graphical representation that may be updated in a logic function block that includes combinational logic associated with power generation equipment.

Figure 4:
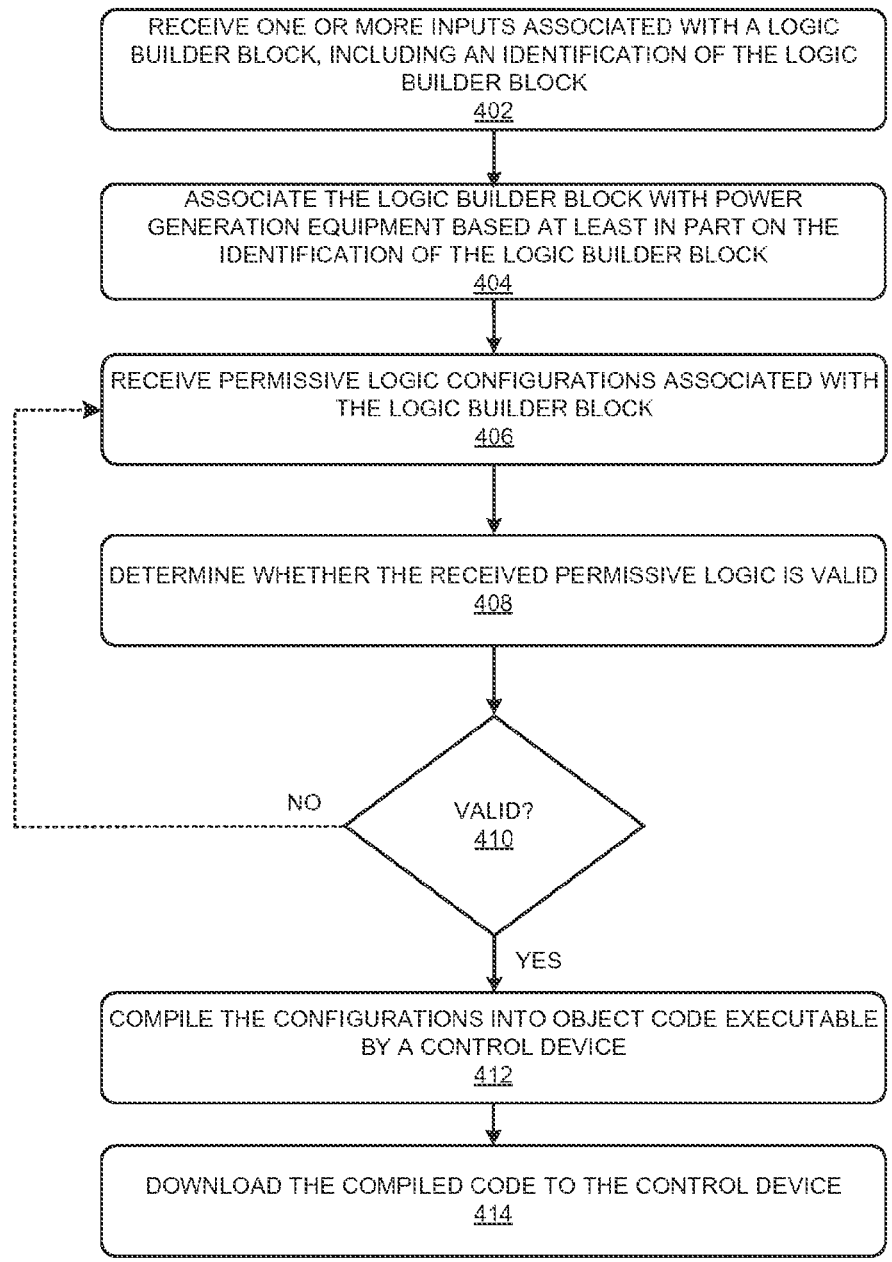
FIG. 4 illustrates a flow diagram of an example process for generating object code that may be executed by a control device, according to an embodiment of the disclosure.

FIG. 4 depicts a flow diagram of an example process for object code that may be executed by a control device, according to an embodiment of the disclosure. The example process may be implemented by the control logic builder block 114 in FIG. 1A, in one embodiment. The example process may begin at block 402, where one or more inputs associated with a logic builder block, including an identifier of the logic builder block, may be received. In certain embodiments herein, a logic builder block may be referred as a container in which permissive or combinational logic may be input, stored, verified, and compiled, among other functions.

At block 404, the received logic builder block may be associated with power generation equipment based at least in part on the identification of the logic builder block. In one embodiment, such identification may be a name of the logic builder block that also corresponds to or matches the name of the power generation equipment. For example, an identification of "SOV" or "solenoid operated valve" may associate a logic function block with a solenoid operated valve in a power generation unit. By virtue of such association, input pins may correspond to signals that may be received from a solenoid operated valve. Such an association may facilitate real-time updates of logic builder block data (e.g., data for input pins and output pins graphically displayed in the logic builder block) associated with the solenoid operated valve or other power generation equipment.

At block 406, permissive logic configurations associated with the logic builder block may be received. As described above, the permissive logic configurations may configure or instruct a control device on controlling power generation equipment.

Certain embodiments herein also relate to verifying received permissive logic configurations in a logic builder block, at block 408. In one embodiment, each configuration in a logic builder block may be verified as it is entered. If the permissive logic configurations are valid, at block 410, the configurations may be compiled into object code that may be executed by a control device, at block 412. The object code may be downloaded to the control device, at block 414. If the received permissive logic configurations are not valid, as determined at block 410, then the configurations may be rejected and processing may return to block 406, where permissive logic configurations may be received.

Figure 5:
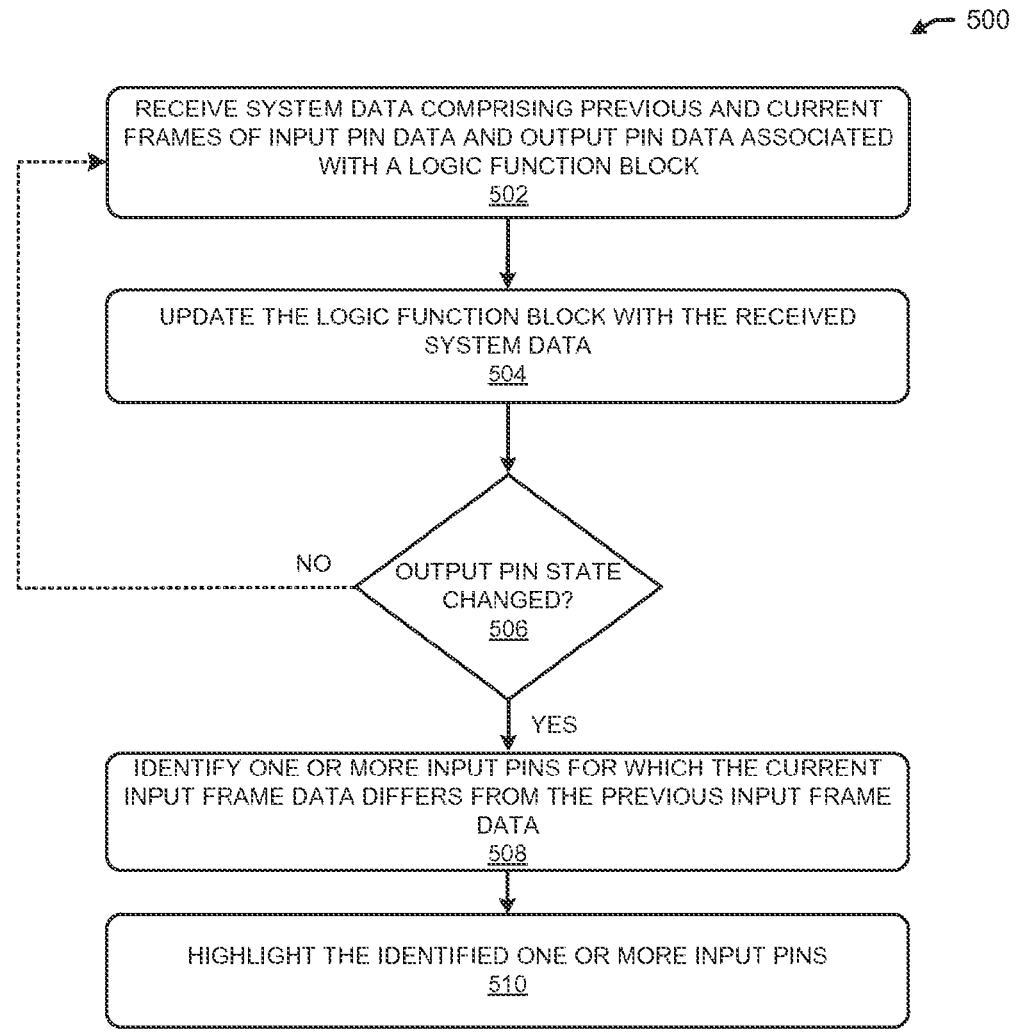
FIG. 5 illustrates a flow diagram of an example process for identifying pin state changes in permissive logic, according to an embodiment of the disclosure.

FIG. 5 depicts a flow diagram of an example process for identifying pin state changes in permissive logic, according to an embodiment of the disclosure. The example process may begin at block 502, where system data including previous and current frames of input pin data and output pin data associated with a logic function block may be received. The logic function block may be updated with the received system data, at block 504.

A determination may be made as to whether the state associated with an output pin has changed and, if so, as determined at block 506, then one or more input pins for which the current input pin data value differs from the previous input pin data value may be identified, at block 508. Input pins that change in such a manner may indicate that power equipment signals associated with the input pin data may have caused the output state to change, and thus, may require troubleshooting or further investigation. At block 510, input pins having values that changed from the previous frame to the current frame may be highlighted on an HMI/SCADA screen to indicate to an operator or other user that the highlighted pin (e.g., a power generation equipment component) may require attention. Highlighting may include changing a primary or background color associated with the input pin.

The processes 300, 400, and 500 are illustrated as logical flow diagrams, in which each operation represents a sequence of operations that can be implemented in hardware, software, or a combination thereof. In the context of software, the operations can represent computer-executable instructions stored on one or more computer-readable storage media that, when executed by one or more processors, perform the recited operations. Generally, computer-executable instructions can include control blocks, routines, programs, objects, components, data structures, and the like that perform particular functions or implement particular abstract data types. The order in which the operations are described is not intended to be construed as a limitation, and any number of the described operations can be combined in any order and/or in parallel to implement the process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed is:

1. A method comprising:
receiving, at a control device, one or more signals from a power generation equipment, wherein the one or more signals received from the power generation equipment include at least one previous frame and a current frame of input pin data and output pin data, wherein the input pin data and the output pin data are associated with at least one logic builder block of the power generation equipment, wherein the logic builder block comprises at least one combinational Boolean logic block;
processing, by the control device, the one or more signals to control the power generation equipment according to permissive logic instructions that permit or prohibit progression in a state machine or a process presented in a graphical representation of the logic builder block, the graphical representation including the at least one combinational Boolean logic block, wherein the logic builder block includes one or more input pins of combinational logic blocks, each of the one or more input pins being associated with one of the one or more signals;
based on the processing, sending, by the control device, data associated with the one or more signals to a storage area for updating on a display;
determining, by the control device, at least one change of an input pin value between the previous frame and the current frame that causes at least one output pin associated with at least one of the combinational Boolean logic blocks to change; and
providing, on the display, a real-time updated graphical representation of the logic builder block that includes the at least one combinational Boolean logic block, wherein the at least one change of the input pin value is visually indicated by highlighting.

2. The method of claim 1, further comprising associating, by the control device, the one or more signals with the one or more input pins associated with the graphical representation.

3. The method of claim 1, wherein the graphical representation comprises the combinational logic blocks, wherein the at least one output pin associated with the combinational logic blocks is updated based at least in part on the one or more signals.

4. The method of claim 1, further comprising receiving, by the control device, compiled object code comprising the permissive logic instructions.

5. The method of claim 1, wherein the power generation equipment comprises a generator or a turbine.

6. The method of claim 1, wherein the display comprises a human machine interface (HMI) display or a supervisory control and data acquisition (SCADA) display.

7. A system comprising:
at least one memory that stores computer-executable instructions; and at least one processor configured to access the at least one memory, wherein the at least one processor is configured to execute the computer-executable instructions to:

receive one or more signals from a power generation equipment, wherein the one or more signals received from the power generation equipment include at least one previous frame and a current frame of input pin data and output pin data, wherein the input pin data and the output pin data are associated with at least one logic builder block of the power generation equipment, wherein the logic builder block comprises at least one combinational Boolean logic block;

process the one or more signals to control the power generation equipment according to permissive logic instructions that permit or prohibit progression in a state machine or a presented in a graphical representation of the logic builder block, the graphical representation including the at least one combinational Boolean logic block, wherein the logic builder block includes one or more input pins of combinational logic blocks, each of the one or more input pins being associated with one of the one or more signals;

send, based on processing, data associated with one or more changes in input values of one or more input pins of the combinational logic blocks associated with the logic builder block;

determine, by the control device, at least one change of an input pin value between the previous frame and the current frame that causes at least one output pin associated with at least one of the combinational Boolean logic blocks to change for updating on a display; and provide, on the display, a real-time updated graphical representation of the logic builder block that includes the at least one combinational Boolean logic block with the at least one change of the input pin value being visually indicated by highlighting.

8. The system of claim 7, the at least one processor further configured to associate the one or more signals with the one or more input pins associated with the graphical representation.

9. The system of claim 7, wherein the graphical representation comprises the combinational Boolean logic blocks, wherein the at least one output pin associated with the combinational logic blocks is updated based at least in part on the one or more signals.

10. The system of claim 7, the at least one processor further configured to receive compiled object code comprising the permissive logic instructions.

11. The system of claim 7, wherein the power generation equipment comprises a generator or a turbine.

12. The system of claim 7, wherein the display comprises a human machine interface (HMI) display or a supervisory control and data acquisition (SCADA) display.

13. A method comprising:

receiving, by a computing device, one or more inputs for configuring a logic builder block associated with permissive logic instructions that permit or prohibit progression in a state machine or a process to control a power generation equipment, wherein the logic builder block comprises at least one combinational Boolean logic block;

compiling, by the computing device, instructions associated with at least a portion of the one or more inputs to generate object code for execution by a control device; and sending, by the computing device, the compiled object code to the control device, wherein the compiled object code when executed causes the control device to:

send real-time data associated with the one or more signals from the power generation equipment to a display, wherein the one or more signals include at least one previous frame and a current frame of input pin data and output pin data, wherein the input pin data and the output pin data are associated with at least one logic function block of the power generation equipment, wherein the display comprises a graphical representation of the logic builder block, the graphical representation including the at least one combinational Boolean logic block, wherein each of the one or more signals is associated with one or more input pins of combinational logic blocks in the logic builder block;

using the data, detect one or more changes in values of the one or more input pins of the combinational logic blocks;

determine at least one change of an input pin value between the previous frame and the current frame that causes at least one output pin associated with at least one of the combinational Boolean logic blocks to change; and visually indicate by highlight the at least one change in the graphical representation of the logic builder block.

14. The method of claim 13, wherein the one or more inputs comprise the logic builder block and an identification of the logic builder block.

15. The method of claim 14, wherein the one or more inputs further comprise one or more combinational logic blocks associated with the logic builder block.

16. The method of claim 14, further comprising associating, by the computing device, the logic builder block with equipment in the power generation equipment based at least in part on the identification.

17. The method of claim 13, further comprising determining, by the computing device, whether the one or more inputs are valid.

* * * * *